Patented Oct. 6, 1942

2,297,801

UNITED STATES PATENT OFFICE 2,297,801

AZO DYES

Swanie S. Rossander and Chiles E. Sparks, Wilmington, Del., assignors to E. I. du Pont de Nemours & Company, Wilmington, Del., a corporation of Delaware No Drawing. Original application July 13, 1940, Serial No. 345,304. Divided and this application December 24, 1940, Serial No. 371,582

6 Claims. (Cl. 260—144)

This invention relates to dyestuffs, in particular to colors substantive to cotton, regenerated cellulose, and certain other fibers and being, in general, of brown shades.

The direct dyes are those which can be applied directly from a water bath to the fiber. In general such colors have bright shades and moderate light fastness, but lack fastness to washing, losing strength and imparting stains to interwoven fibers. In order to overcome this imperfection, it has become the practice to apply direct colors containing amino groups to the fiber and diazotizing and developing them thereon with a suitable coupling component. It is an object of this invention to make direct dyes which can be developed on the fiber with known developing agents to produce developed dyeings of good characteristics, particularly of fastness.

The objects of the invention are accomplished by a class of trisazo colors of which the first component has a benzene or naphthalene nucleus, the last component is a urea-meta-phenylene-diamine, otherwise called 3:3'-diamino-sym.-diphenyl-urea, and the intermediate components are taken from a class of compounds having a benzene or naphthalene nucleus or being benzamido or naphthamido derivatives thereof. The nuclei of the several constituents may have a variety of substituents, the more favorable of which are indicated hereinafter, but in the preferred form of the invention each dye molecule will have at least two water solubilizing groups.

Examples of the classes of compounds useful in the first position are:

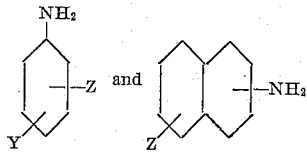

in which Z is one or more of the group hydrogen and sulfonic acid and Y is one or more of the group hydrogen, alkyl, alkoxy and halogen. Specific mention is made of the following:

1-amino-naphthalene-6-sulfonic acid
2-amino-naphthalene-6-sulfonic acid
1-amino-naphthalene-4-sulfonic acid
2-naphthylamine-5,7-disulfonic acid
1-amino-4-methyl-benzene-3-sulfonic acid
1-amino-2-chloro-benzene-5-sulfonic acid
1-amino-3-chloro-6-methyl-benzene-4-sulfonic acid
2-amino-naphthalene-3,6-disulfonic acid
1-amino-naphthalene-3,8-disulfonic acid
2-amino-naphthalene-4,8-disulfonic acid.

Examples of simple intermediate groups are as follows:

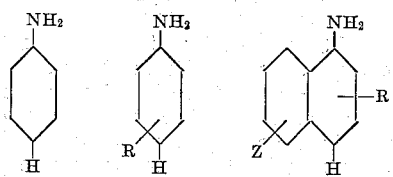

in which R is one or more of the group hydrogen, alkyl, and alkoxy, and Z is one or more of the group hydrogen and sulfonic acid. Specific mention is made of:

1-amino-naphthalene-7-sulfonic acid
1-amino-2-methoxy-5-methyl-benzene
1-amino-2,5-dimethyl-benzene
1-amino-2-methoxy-benzene
1-amino-3-methoxy-benzene
1-amino-2-methyl-benzene
1-amino-3-chloro-6-methyl-benzene Examples of the more complex intermediate members are:

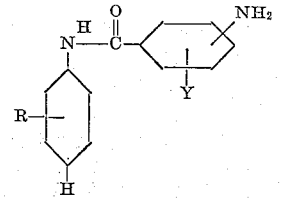

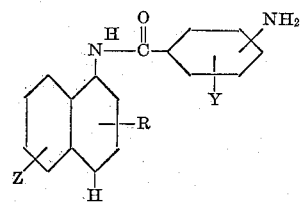

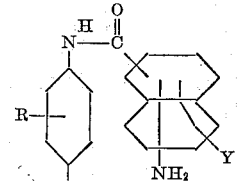

and

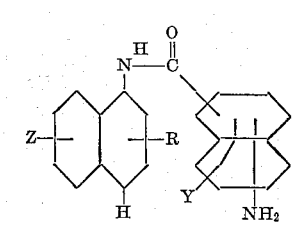

The significance of the symbols is as explained above. At least one sulfonic acid group or an equivalent should be present in the dye molecule in order to induce sufficient water-solubility. Where the symbol H is shown in a formula, it is intended to indicate that that point of the ring is not substituted. The group

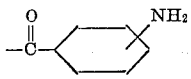

may be introduced by coupling the diazo component to the parent arylamine coupling component, condensing the monoazo dye with m- or p-nitro-benzoyl-chloride, and reducing the nitro group to amino.

The following examples illustrate but do not limit the scope of the invention:

*Example I*

Slurry 30.3 parts of 2-amino-naphthalene-6,8-disulfonic acid with 300 parts of water. Ice the mixture to 10±2° C. and diazotize by adding 9.1 parts of hydrochloric acid followed, as rapidly as it is adsorbed, by 6.9 parts of sodium nitrite. Add ice as required to insure a temperature of 15±2° C. Maintain Congo red acidity and a slight excess nitrite for fifteen minutes.

Add to the diazo solution 11.2 parts of 1-amino-3-methyl-benzene and five minutes later 27.2 parts of crystalline sodium acetate. Continue agitation 10-12 hours, allowing the temperature to rise to that of the surroundings.

Cool the combination to 20±1° C. and add 16.4 parts of hydrochloric acid quickly. Then add slowly 7.6 parts of sodium nitrite. Maintain, after the last addition of nitrite, for fifteen minutes a temperature of 23±2° C. Congo red acidity, and a medium test for excess nitrite on potassium iodide-starch papers.

Add 10% salt by volume to the diazo slurry, stir 15 minutes and then add rapidly 12 parts of 1-amino-3-methyl-benzene. Stir 15 minutes.

Dissolve 17 parts of sodium carbonate in 50 parts of warm water and add the solution to the coupling mixture over a period of one hour. Stir then 10-12 hours, maintaining litmus acidity, and allowing the temperature to rise to that of the surroundings.

Heat the charge to 60°±1° C., add 10% salt and stir 30 minutes. If the dye is not completely out of solution as shown by a spot on filter paper, add 4 parts of hydrochloric acid—still leaving the charge neutral to Congo red. Filter.

Slurry the press cake with 800 parts of water and dissolve by adding 7 parts of sodium carbonate. Heat to 90° C., adjust the volume to 1320 parts and add 10 parts of nuchar and 5 parts of filtercel. Agitate at 90° C. for 30 minutes and filter. To the filtrate add 20% salt, stir one hour and filter.

Dissolve the press cake in 800 parts of water and add 9.5 parts of hydrochloric acid. Cool to 20° C. and add 7.8 parts of sodium nitrite as rapidly as adsorbed. Maintain an excess nitrite for one hour with Congo red acidity. Destroy the excess nitrite with sulfamic acid.

Dissolve 24.2 parts of 3,3'-diamino-sym.-diphenyl-urea in 100 parts of water with 7.4 parts of hydrochloric acid. Add this solution to the above diazo slurry. Then make the charge neutral to Congo red with 34 parts of crystalline sodium acetate and stir 10-12 hours.

Heat the charge to 70° C., make acid to Congo red paper with hydrochloric acid and filter. Mix the press cake with 12 parts of sodium carbonate and dry. The product is a dark, water-soluble powder represented by the formula:

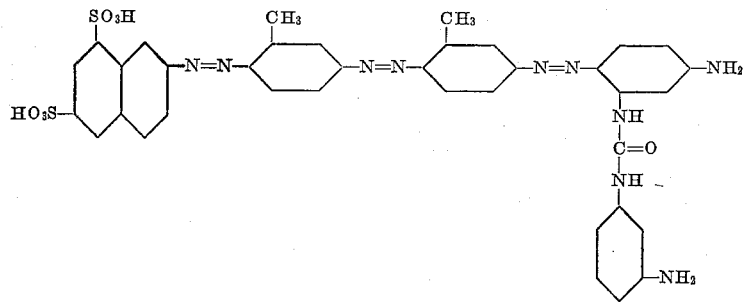

Five parts of cotton piece goods were dyed with one-tenth part of the dye, rinsed in cold water, and put into 200 parts of water at 20° C. Three-tenths part of sodium nitrite and four-tenths part of sulfuric acid were added, and the whole stirred 15 minutes and rinsed in cold water. One-tenth part of beta-naphthol was dissolved in 200 parts of water with one-twentieth part of caustic soda, stirred rapidly and added to the cotton piece goods, stirring being continued for 15 minutes. The goods were rinsed in cold water and dried. The dyeing was a red chocolate brown shade with excellent washing fastness and good discharge properties.

The dye developed on the fiber with beta-naphthol is represented by the formula:

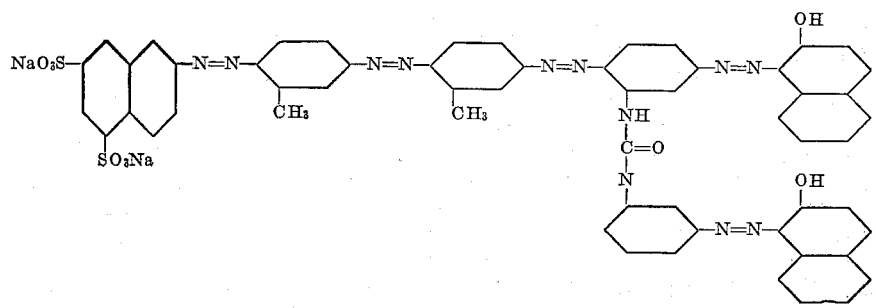

Example II

Carry out the first two couplings, 2-amino-naphthalene-6,8 disulfonic acid→1-amino-3-methyl-benzene→1-amino-3-methyl-benzene, then clarify and isolate as in Example I.

Slurry the press cake with 800 parts of water, add 7 parts of sodium carbonate and heat to 85° C. Add 6.8 parts of crystalline sodium acetate. Holding the temperature at 85° C., add 26 parts of 4-nitro-benzoyl-chloride, as a 20% carbon tetrachloride solution, over a period of two hours.

Heat to 85°±1° C. and add rapidly 14.6 parts of sodium disulfide. Agitate one hour at this temperature, maintaining a strong excess disulfide. The reduction is then considered to be complete.

Salt 25% and stir one hour. Filter.

Subject the press cake to diazotization, couple to 3,3'-diamino-sym.-diphenyl-urea, and isolate as in the final coupling of Example I.

This product is a dark, water-soluble powder. Dyeings developed with beta-naphthol are brown. The probable formula is:

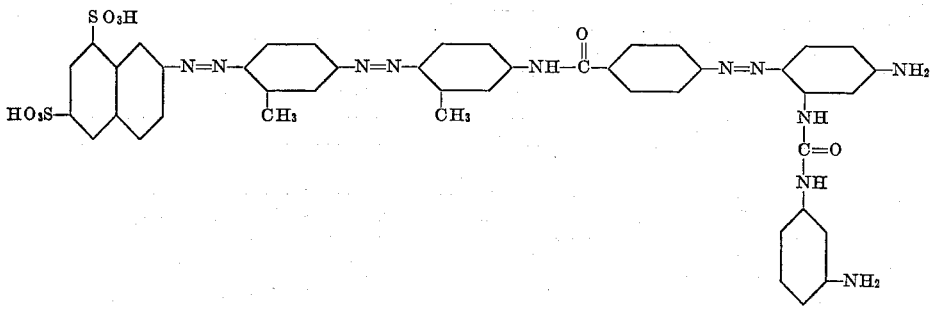

Add sodium carbonate as required to maintain the solution at all times slightly alkaline to Brilliant yellow. Take samples and test for completeness of condensation during the addition of the 4-nitro-benzoyl-chloride. This test is made in the following manner: Make a cooled sample acid to Congo red and add sodium nitrite until an excess remains for 10 minutes. Couple to a sodium carbonate solution of 2-phenyl-amino-5-hydroxy-naphthalene-7-sulfonic acid. Dye a small piece of cotton with this solution. Consider the condensation complete when the shade difference between the last two dyeings is slight.

Example III

Couple diazotized 2-amino-naphthalene-6,8-disulfonic acid to 1-amino-3-methyl-benzene as in Example I. Condense this coupling with 3-nitro-benzoyl-chloride and reduce as in Example II. Diazotize this combination and couple to 1-amino-3-methyl-benzene and then diazotize and couple to 3,3'-diamino-sym.-diphenyl-urea as in the previous examples. Isolate as before.

The product is a dark powder, soluble in water. Dyeings developed with beta-naphthol are yellow brown. The probable formula is:

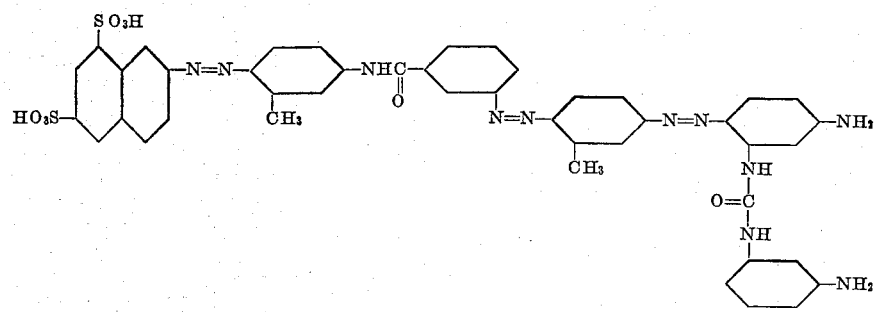

Salt the charge 25% on volume, stir one hour and filter.

Slurry the press cake with 800 parts of water and add sodium carbonate as required to make the charge medium alkaline to Brilliant yellow.

Following are tabulated representative products of the invention, with the shades of the developed dyeings on cotton. The compositions of the products are designated by the components used. The arrows point from the diazo components toward the coupling components.

| Example | Composition of product | Color of developed (beta-naphthol) dyeing |
|---|---|---|
| IV | 2-amino-naphthalene-6,8-disulfonic acid ⟶ 1-amino-naphthalene ⟶ 1-(4'-amino-benzoyl-amino-)-3-methyl-benzene ⟶ 3,3'-diamino-sym.-diphenyl-urea. | Red brown. |
| V | 1-amino-benzene-4-sulfonic acid ⟶ 1-amino-naphthalene-6-sulfonic acid ⟶ 1-(4'-amino-benzoyl-amino)-3-methyl-benzene ⟶ 3,3'-diamino-sym.-diphenyl-urea. | Do. |
| VI | 2-amino-naphthalene-6,8-disulfonic acid ⟶ 1-amino-3-methyl-benzene ⟶ 1-(4'-amino-benzoyl-amino)-naphthalene-6-sulfonic acid ⟶ 3,3'-diamino-sym.-diphenyl-urea. | Do. |
| VII | 1-amino-benzene-4-sulfonic acid ⟶ 1-(4'-amino-benzoyl-amino)-3-methyl-benzene ⟶ 1-amino-naphthalene-6-sulfonic acid ⟶ 3,3'-diamino-sym.-diphenyl-urea. | Chocolate brown. |
| VIII | 2-amino-naphthalene-6,8-disulfonic acid ⟶ 1-(4'-amino-benzoyl-amino)-naphthalene ⟶ 1-amino-3-methyl-benzene ⟶ 3,3'-diamino-sym.-diphenyl-urea. | Brown. |
| IX | 2-amino-naphthalene-6,8-disulfonic acid ⟶ 1-amino-2,5-dimethoxy-benzene ⟶ 1-amino-3-methyl-benzene ⟶ 3,3'-diamino-sym.-diphenyl-urea. | Blue chocolate brown. |
| X | 2-amino-naphthalene-4,8-disulfonic acid ⟶ amino-benzene ⟶ 1-amino-3-methyl-benzene ⟶ 3,3'-diamino-sym.-diphenyl-urea. | Brown. |

| Example | Composition of product | Color of developed (beta-naphthol) dyeing |
|---|---|---|
| XI | 2-amino-naphthalene-6,8-disulfonic acid ⟶ 1-amino-3-methyl-benzene ⟶ 1-amino-naphthalene-6-sulfonic acid ⟶ 3,3'-diamino-sym.-diphenyl-urea. | Blue chocolate brown. |
| XII | 2-amino-naphthalene-6,8-disulfonic acid ⟶ 1-amino-naphthalene ⟶ 1-amino-naphthalene-6-sulfonic acid ⟶ 3,3'-diamino-sym.-diphenyl-urea. | Do. |
| XIII | 2-amino-naphthalene-6,8-disulfonic acid ⟶ 1-amino-naphthalene-6-sulfonic acid ⟶ 1-amino-naphthalene-6-sulfonic acid ⟶ 3,3'-diamino-sym.-diphenyl-urea. | Do. |
| XIV | 1-amino-benzene-2,5-disulfonic acid ⟶ 1-amino-3-methyl-benzene ⟶ 1-amino-naphthalene-6-sulfonic acid ⟶ 3,3'-diamino-sym.-diphenyl-urea. | Blue brown. |
| XV | 1-amino-benzene-2,5-disulfonic acid ⟶ 1-amino-naphthalene ⟶ 1-amino-naphthalene-6-sulfonic acid ⟶ 3,3'-diamino-sym.-diphenyl-urea. | Do. |
| XVI | 1-amino-benzene-2,5-disulfonic acid ⟶ 1-amino-naphthalene-6-sulfonic acid ⟶ 1-amino-naphthalene-6-sulfonic acid ⟶ 3,3'-diamino-sym.-diphenyl-urea. | Do. |
| XVII | 1-amino-benzene-3-sulfonic acid ⟶ 1-amino-naphthalene-6-sulfonic acid ⟶ 1-amino-3-methyl-benzene ⟶ 3,3'-diamino-sym.-diphenyl-urea. | Chocolate. |

| Example | Composition of product | Developer | Color |
|---|---|---|---|
| XVIII | 2-amino-naphthalene-6,8-disulfonic acid ⟶ 2,5-dimethoxy-1-amino-benzene ⟶ 3-amino-1-methyl-benzene ⟶ 3,3'-diamino-sym.-diphenyl-urea. | Phenyl-methyl-pyrazolone. | Brown. |
| XIX | ...do... | Meta-toluylene-diamine. | Chocolate brown. |
| XX | ...do... | Aceto-acetanilide. | Brown. |
| XXI | 2-amino-naphthalene-6,8-disulfonic acid ⟶ 3-amino-1-methyl-benzene ⟶ 3-amino-1-methyl-benzene ⟶ 3,3'-diamino-sym.-diphenyl urea. | Phenyl-methyl-pyrazolone. | Red brown. |
| XXII | ...do... | Meta-toluylene diamine. | Brown. |
| XXIII | ...do... | Aceto-acetanilide. | Red brown. |

Development has been shown with a number of coupling components in order that the colors may be compared with one another. Classes of coupling components represented in the examples are phenyl-alkyl-pyrazolones, meta-aryl-diamines, aceto-acet-anilides, and the arylides of 2:3-hydroxy-naphthoic acid. Other known coupling components may also be used.

The new products are of excellent washing fastness when developed on the fiber. Furthermore, their discharge is usually good. For satisfactory use a considerable degree of water solubility is required in the new compounds before development. This water solubility is secured by including in the dye molecule as substituents on the aryl nuclei certain water-solubilizing groups. Among the more commonly used water-solubilizing groups are sulfonic and carboxylic acid groups, but others are also well known and to some extent used. All such water-solubilizing groups are included within the scope of this invention. In general, the inclusion in the molecule of two such groups produces a sufficient degree of water-solubility. The colors can be prepared apart from the fiber to form pigments of useful properties. For example:

*Example XXIV*

10 parts of the direct color of Example I were dissolved in about 250 parts of water, heating to 60–70° C. Sufficient hydrochloric acid was added to make the solution ½ spot on Congo red paper, the mixture was cooled to 15° C., and sodium nitrite was added as fast as it was absorbed. ½ spot acidity on Congo red paper, a temperature of 15° C., and a distinct test for excess nitrite on potassium iodide-starch paper were maintained for one hour. An amount of beta-naphthol equivalent to 105% of the nitrite absorbed in the above tetrazotization was dissolved in 250 cc. water with just enough caustic soda for complete solution, soda ash equivalent in amount to the hydrochloric acid used in the above tetrazotization was added and the whole was cooled to 0–5° C. The tetrazo slurry was added to this beta-naphthol solution slowly while maintaining good agitation, a temperature of 0–5° C. and soda ash alkalinity. After all of the tetrazo slurry had been added, stirring was continued for two hours at 70° C. before filtering. The dry powders were dark brown in appearance.

The pigment thus prepared is represented by the formula:

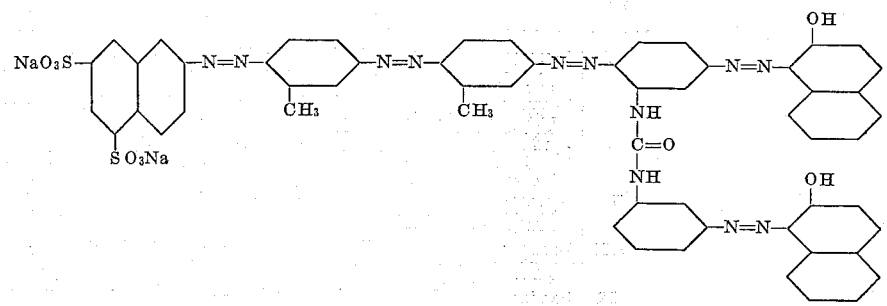

Following this procedure with the direct color of Example IX, a pigment represented by the following formula was formed:

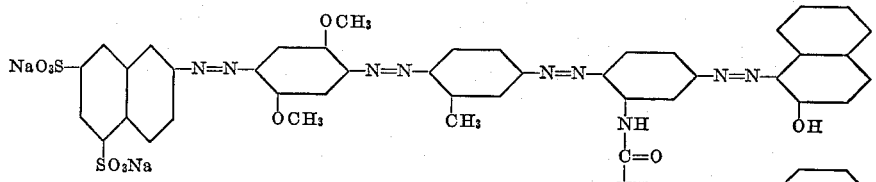

This application is a division of application Serial No. 345,304, filed July 13, 1940, patented April 7, 1942, Number 2,278,491.

As many apparently widely different embodiments of this invention may be made without departing from the spirit and scope thereof, it is to be understood that we do not limit ourselves to the specific embodiments thereof except as defined in the appended claims.

We claim:

1. The compounds represented by the formula:

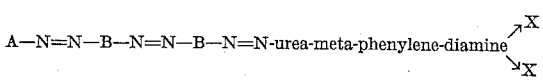

in which A and B are radicals of the class consisting of the benzene and naphthalene series, and X is a coupling component from the group consisting of beta-naphthol, phenyl-alkyl-pyrazolones, meta-arylene-diamines, acetoacetanilides, and the arylides of 2,3-hydroxy-naphthoic acid.

2. The compounds represented by the formula:

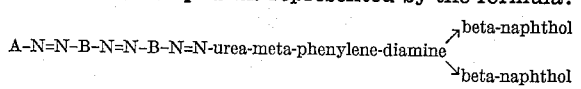

in which A and B are radicals of the class consisting of the benzene and naphthalene series.

3. The compound represented by the formula:

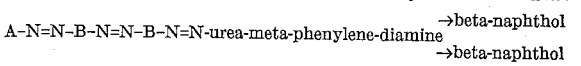

in which A is a radical of the naphthalene series and B is a radical of the benzene series.

4. The compound represented in its acid form by the formula:

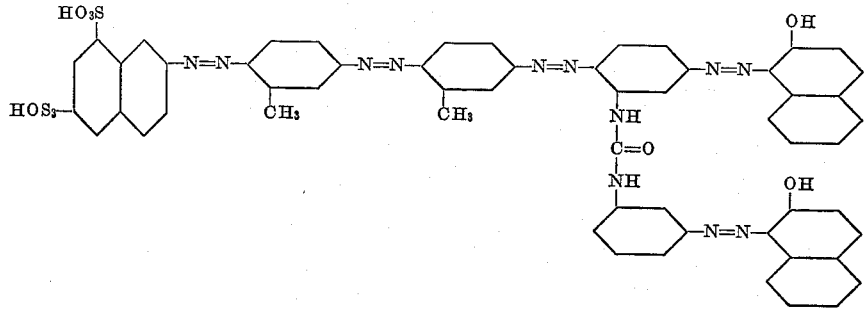

5. The compound represented in its acid form by the formula:

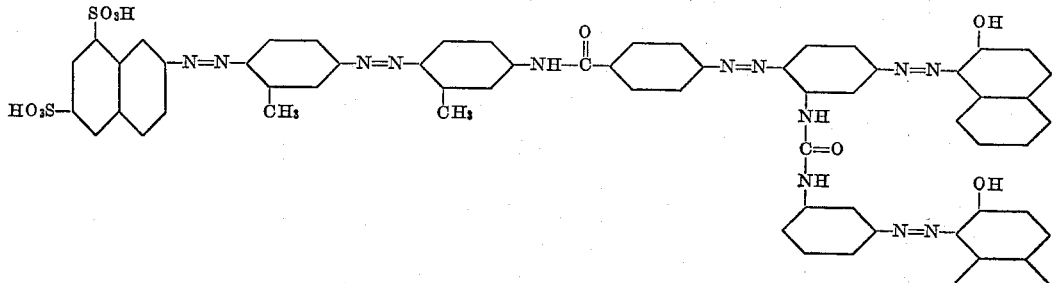

6. The compound represented by the formula:

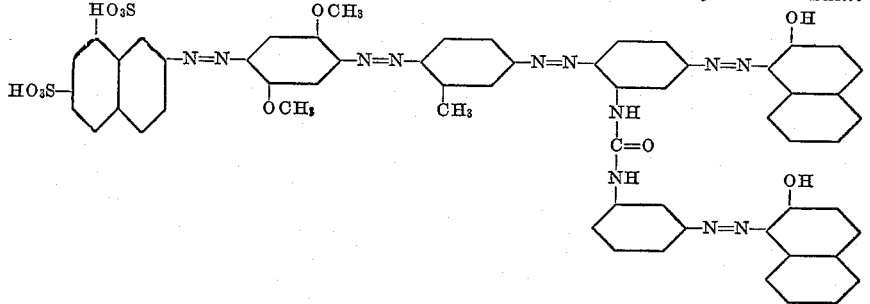

SWANIE S. ROSSANDER.
CHILES E. SPARKS.